United States Patent [19]
Kim

[11] Patent Number: 5,742,283
[45] Date of Patent: Apr. 21, 1998

[54] HYPERSTORIES: ORGANIZING MULTIMEDIA EPISODES IN TEMPORAL AND SPATIAL DISPLAYS

[75] Inventor: Michelle Yoonkyung Lee Kim, Scarsdale, N.Y.

[73] Assignee: International Business Machines Corporation, Armonk, N.Y.

[21] Appl. No.: 843,312

[22] Filed: Apr. 15, 1997

Related U.S. Application Data

[63] Continuation of Ser. No. 127,863, Sep. 27, 1993, abandoned.
[51] Int. Cl.$^6$ ........................................... G06F 17/00
[52] U.S. Cl. ..................... 345/302; 707/539; 707/517
[58] Field of Search ......................... 395/806, 807, 395/762, 776–778, 779, 780, 802

[56] References Cited

U.S. PATENT DOCUMENTS

| | | | |
|---|---|---|---|
| 4,630,234 | 12/1986 | Holly | 395/600 |
| 4,831,552 | 5/1989 | Scully et al. | 395/153 |
| 4,864,516 | 9/1989 | Gaither et al. | 395/153 |
| 4,893,256 | 1/1990 | Rutherfoord et al. | 395/154 |
| 4,914,586 | 4/1990 | Swinehart et al. | 395/600 |
| 4,947,257 | 8/1990 | Fernandez et al. | 348/585 |
| 4,974,178 | 11/1990 | Izeki et al. | 395/100 |
| 5,010,500 | 4/1991 | Makkuni et al. | 395/155 |
| 5,065,345 | 11/1991 | Knowles et al. | 395/154 |
| 5,109,482 | 4/1992 | Bohrman | 395/154 |
| 5,119,474 | 6/1992 | Beitel et al. | 395/154 |
| 5,130,794 | 7/1992 | Ritchey | 348/39 |
| 5,204,947 | 4/1993 | Bernstein et al. | 395/157 |
| 5,208,745 | 5/1993 | Quentin et al. | 395/161 |
| 5,241,657 | 8/1993 | Fine et al. | 395/162 |
| 5,241,671 | 8/1993 | Reed et al. | 395/600 |
| 5,274,758 | 12/1993 | Beitel et al. | 395/154 |
| 5,333,299 | 7/1994 | Koval et al. | 395/550 |
| 5,339,393 | 8/1994 | Duffy et al. | 395/161 |
| 5,339,423 | 8/1994 | Beitel et al. | 395/600 |
| 5,398,195 | 3/1995 | Kim | 364/419 |

FOREIGN PATENT DOCUMENTS

| | | |
|---|---|---|
| 62-89058 | 4/1987 | Japan . |
| WO9217851 | 10/1992 | WIPO . |

OTHER PUBLICATIONS

Authorware Professional Users Guide, Macromedia, Inc., pp. 27–67, Dec. 1992.

T. Yoneda et al, "A New Communication Tool: Time Dependent Multimedia Document", IEEE, pp. 90–97, Jun. 9, 1992.

T.D.C. Little et al, "Spatio–Temporal Composition of Distributed Multimedia Objects for Value–Added Networks", Computer, Oct. 1991, pp. 42–50.

J.A. Elliot, J.L. Gaudet, R.J. Goodrich, R.A. Thornton "Method to Include Audio Objects and Non–Text Objects in Text", *IBM TDB*, vol. 30, No. 7, Dec. 1987, pp. 355–356.

H.M. Gladney et al., "Architecture and Design of a Document Storage Subsystem", Res. San Jose (Abstract), Dec. 1989.

(List continued on next page.)

*Primary Examiner*—Joseph R. Burwell
*Attorney, Agent, or Firm*—Whitham, Curtis, Whitham & McGinn; Louis J. Percello

[57] ABSTRACT

The design, creation, organization, and playing of multimedia stories is accomplished by first defining a story with episodes scheduled on a temporal layout. The organization of the story episodes is then separated into two parts: (1) a temporal organization of story episodes using temporal cliques, and (2) a spatial organization which spatially organizes the members of each temporal clique independently of the members of other temporal cliques. A complicated multimedia problem that exists in time and space is reduced to a number of smaller problems that exist only in space. Stories that are organized according this way can be related by a directed graph into a hyperstory. Using the directed graph, different stories in the hyperstory can be played by satisfying defined asynchronous conditions. The conditions are used in the graph to define the relationships among the stories in the graph.

17 Claims, 7 Drawing Sheets

OTHER PUBLICATIONS

H. Kautz, P. Ladkin, "Integrating Metric and Qualitative Temporal Reasoning", AAAI, 1991. pp. 241–246.

M. Vilain, H. Kautz, "Constraint Propagation Algorithms for Temporal Reasoning," AAAI, Jan. 1986, pp. 377–382.

R. Dechter, I. Meiri and J. Pearl, "Temporal Constraint Networks", Artificial Intelligence, 49, Jan. 1991, pp. 61–95.

J. Allen, "Maintaining Knowledge about Temporal Intervals," CACM, vol. 26, No. 11, Nov. 1983, pp. 832–843.

HYPERSTORIES: ORGANIZING MULTIMEDIA EPISODES IN TEMPORAL AND SPATIAL DISPLAYS

RELATED APPLICATIONS

This application is a continuation of U.S. patent application Ser. No. 08/127,863, filed on Sep. 27, 1993, now abandoned.

FIELD OF THE INVENTION

This invention relates to the field of creating, organizing, and playing multimedia documents on a computer system. More specifically, the invention relates to organizing multimedia objects in a multimedia documents so that they are presented correctly in space and time.

BACKGROUND OF THE INVENTION

Multimedia documents are known in the computer arts. The user of a multimedia document typically presents or receives multimedia information called fragments, segments, multimedia objects, or episodes through the computer input or output, respectively. Generally, these multimedia episodes include information having a sensory quality that can take the form of audio and visual information like audio and video clips, musical recordings, speech, typed text, still pictures, drawings, animation, choreographed dance steps, etc. (Episodes that are presented as output of the computer are said to be "played." A visual output is played as a display.)

To create or play (display) a multimedia document, the computer user must select one or more episodes and play them in a particular order. Multimedia documents are called stories when they have related episodes that are organized and/or played with some sort of spatial relationships and order in time.

While creating or playing stories with a few number of episodes may be easy, the prior art methods fail to create or play stories with a very large number of episodes. This failure occurs because large numbers of story episodes, each having different characteristics, such as start points, end points and durations in time, are difficult to organize so that they can play together without interfering with one another. The prior art has failed to effectively spatially organize large numbers of story episodes as the story is played over time.

Spatial organization determines how played episodes in a story are presented to the user with respect to one another. Typically, spatial organization relates to the size and position of a playing episode on a computer display like a screen. (Note, however, that audio clips can be organized spacial with respect to one another by adjusting the volume of each clip or tying the audio clip to a visual display.) Since a story episode has a spacial requirements with respect to other episodes during its duration, the spacial requirements of playing the story change each time an episode starts or ends. If these changing spacial requirements are not initially accounted for in the design of the story, the story is likely to be played (displayed) with blank spacial regions, overlapped spacial regions (one episode hiding some or all of one or more other episodes), and/or blank or cacophonous audio output. These undesirable events in the output play are called clashes.

The prior art also fails to adequately address the creation of multimedia stories. During story creation, the user starts with an initial story and/or set of episodes and adds, inserts, moves, and deletes episodes to develop a final story. Accordingly, the relationship among some or all of the episodes in the story can change and episode clashes can develop. In other words, stories that initially could be played without an episode clash can develop clashes during story creation. Furthermore, as the story gets longer (i.e., contains more episodes), these clashes become increasingly more difficult to anticipate.

The prior art also does not provide a method easily combining a number of stories and/or episodes in a way to create larger stories (or hyperstories). This is largely due to the limitations discussed above. Adding episodes/stories to a story adds to the spacial and temporal complexities of the problem and usually results in more episode clashes during the story play. In addition, hyperstories have further complications because asynchronous events, like interrupts, can determine which of the stories at a given playing time is played. This can cause a set of episodes that can be played in a sequence without clashes to be played in a different sequence that does have clashes. The prior art has also failed to adequately address or solve the problem of enabling asynchronously driven stories in a hyperstory.

OBJECTS OF THE INVENTION

An object of this invention is an improved method and apparatus for organizing and playing multimedia segments.

Another object of this invention is improved method and apparatus for creating multimedia stories that can be played without clashes.

A further object of this invention is improved method and apparatus for organizing a plurality of multimedia stories into a hyperstory that can be played without clashes.

SUMMARY OF THE INVENTION

The present invention is a method and apparatus for organizing segments of multimedia information, with spacial and temporal requirements, so that they can be played together as a story without clashing. The invention has the novel feature of dividing the organization of the segments into two parts, a temporal organization and a spacial organization. Essentially, the temporal organization is performed in a way that divides segments selected for a story, called episodes, into a number of groups, or temporal cliques. The episodes in each of these temporal cliques can be spatially organized without accounting for the spacial requirements of the episodes not in the clique. This novel separation of the temporal and spacial organization of the multimedia episodes permits very large numbers of multimedia segments to be organized so that they can be played in a story without clashing.

The method starts out by selecting one or more multimedia segments (episodes) that will be played together as a story. The story episodes are scheduled, e.g., in a temporal layout, to define the story by establishing time relationships among the episodes. Using the episode schedule (temporal layout), the episodes are then temporally organized into groups called temporal cliques. The episodes in each temporal clique are then spatially organized with the other members of the clique without accounting for the spacial organization requirements of episodes that are not in the clique. Lastly, the story episodes, organized as temporal cliques, can be played as scheduled in the temporal layout without clashing because the episodes in each temporal clique independently conform to their own spatial organization.

Larger multimedia documents can be created by establishing relationships among more than one story by using directed graphs. (The stories of the directed graph are designed and organized by the method described above.) These documents, also called hyperstories, are created by defining the stories as nodes of the directed graph. The edges of the graph define the control conditions that initiate the playing of a particular story node in the graph. These control conditions can be used to call and branch to selected nodes/stories in the graph without regard to the temporal relationships among the stories. Using the control conditions represented in the direct graph allows the story nodes to be played asynchronously, i.e. to be started by external events like interrupts.

DETAILED DESCRIPTION OF THE INVENTION

The present invention is capable of running on any general purpose computer system which has the ability to present multimedia information to a user. One preferred embodiment 100, that is shown as a block diagram in FIG. 1, uses an IBM Personal System/2 (PS/2) Model 8595 Microchannel Floor Standing 486 System 105 (described in the Quick Reference supplied with the system unit). An IBM Personal System/2 (PS/2) ActionMedia II Display Adapter 110 (described in the ActionMedia II Technical Reference) is used for audio/video capture 122 and playback 124. This preferred embodiment also uses an IBM Operating System/2 (OS/2) 2.0 (described in the OS/2 2.0 Quick Reference), an IBM Multimedia Presentation Manager/2 (described in the IBM Multimedia Presentation Manager/2 ActionMedia(R) II Media Control interface Programming Guide and Reference), and a Smalltalk/VPM (described in the Smalltalk/VPM Tutorial and Programming Handbook). Other multimedia hardware 130 known in the art that can be connected to a general purpose computer can also be used. This hardware 130 may include video cassette recording devices, laser disc player adapters, audio capture playback adapters, etc. The marks OS/2 and PS/2 are trademarks of the IBM Corporation, the mark ActionMedia II is a trademark of the Intel Corporation, and the mark Smalltalk/VPM is a trademark of Digitalk, Inc..

Figure 2:
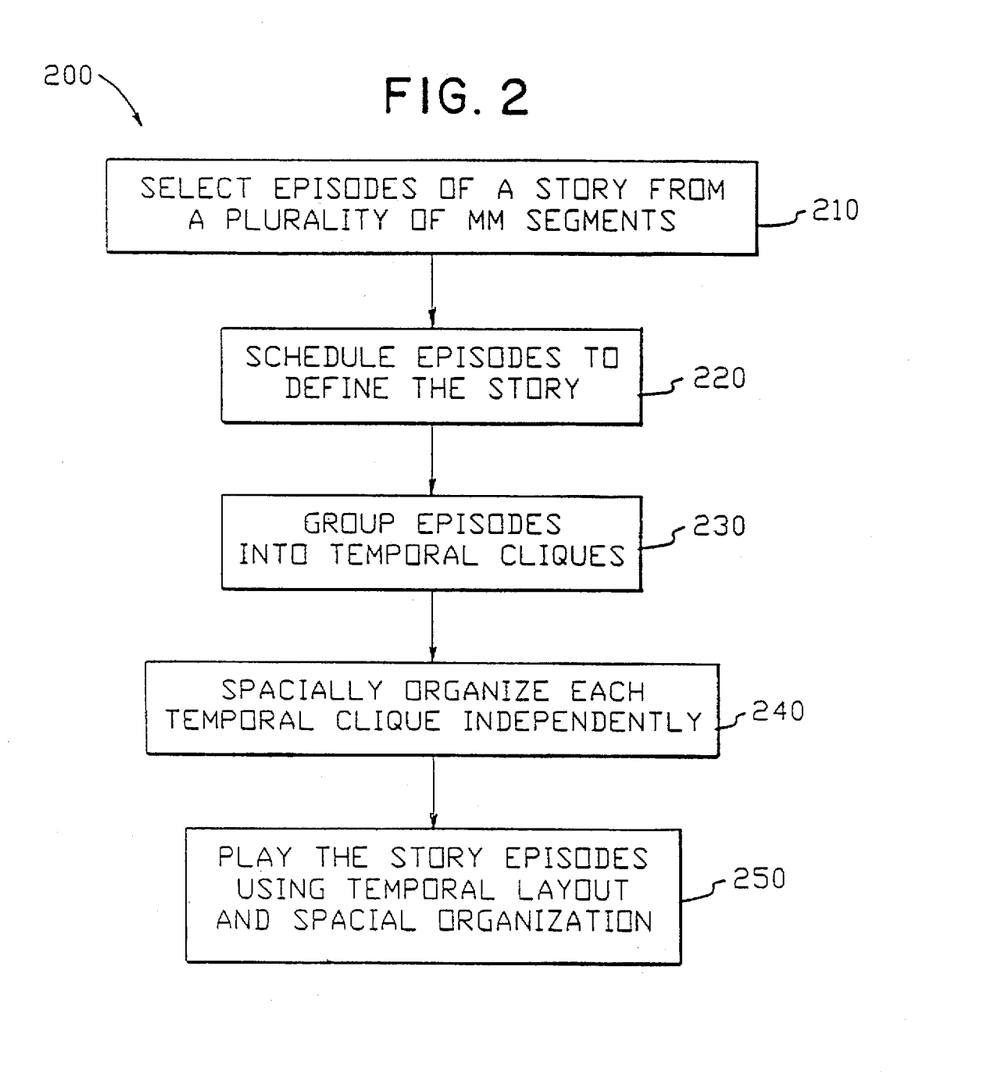
FIG. 2 is a flow chart showing the steps of the present invention.

FIG. 2 is a flowchart that shows the steps of the present method 200.

The method starts with a set of multimedia segments that may or may not have a relationship to one another. A subset of these segments, to be used in a story, are then selected 210. The selected segments are called episodes of the story. The story episodes are then scheduled together 220 in a way that defines the story. This scheduling can be represented in a temporal layout 220.

Using the temporal layout, the episodes of each story are grouped into temporal cliques 230. In a preferred embodiment, the episodes in each temporal clique have the property that some part of the duration of each episode of the temporal clique overlaps some part of the duration of all the other episodes in the temporal clique. Episodes that do not overlap some part of the duration of every other episode in the clique are removed from the clique and placed in another clique. (in an alternative embodiment, certain episodes that do not overlap every clique episode might remain in the clique. An example would be an episode that starts and ends within the duration of another clique member.) Because all episodes in a temporal clique overlap durations, the episodes of each temporal clique exist together at some point in time and therefore will have to be spatially organized with respect to one another to be played (displayed) together. Generally, episodes that do not overlap any part of the durations of the members of a clique, do not exist with the temporal clique members (group) at a point in time and do not have to be spatially organized with respect to all the members of the temporal clique. Accordingly, this novel organization of the story episodes into temporal cliques enables the episodes of the story to be separated into groupings (the temporal cliques) that contain episode members that can be spatially organized together without accounting for the spacial organization of episodes in the story that are not in the temporal clique. As a result, complex multimedia documents with large numbers of multimedia segments (episodes) can be organized in both space and time by separating the document into smaller groups of story episodes (temporal cliques) that each only need to be organized in space (spatially).

Further, this novel feature of the present invention also affords a more efficient way to design and create large multimedia documents. Once the final document is defined (i.e., the episodes are scheduled), the episodes are organized into temporal cliques that can be spatially organized independent of one another. This insures that the full final multimedia document can be organized and played according to its schedule (e.g., temporal layout) without clashes. This organization and playing is difficult or impossible to accomplish using prior art methods.

In the next step of the method 200, the episodes of each temporal clique are spatially organized 240. The spacial organization determines what spacial characteristics each episode in a temporal clique will have when it is played (displayed) along with other episodes in the clique. These spacial characteristics include the size, shape, orientation, and location of the episode on the display. Since the story episodes are grouped in temporal cliques prior to being spatially organized and since the temporal cliques contain all the episodes that exist together at one point in time, the episodes in each temporal clique can be spatially organized independently of the spacial organization of the episodes in other temporal cliques of the story (or hyperstory). In other words, the episodes on each temporal clique represent the episodes that will be played (displayed) on one screen of the story. (A screen is what is being played in the story/hyperstory at one point in time.) After the spacial organization of all the temporal cliques of the story (hyperstory) is completed, the episodes can be played 250 without clashing according to the schedule in the temporal layout.

Figure 1:
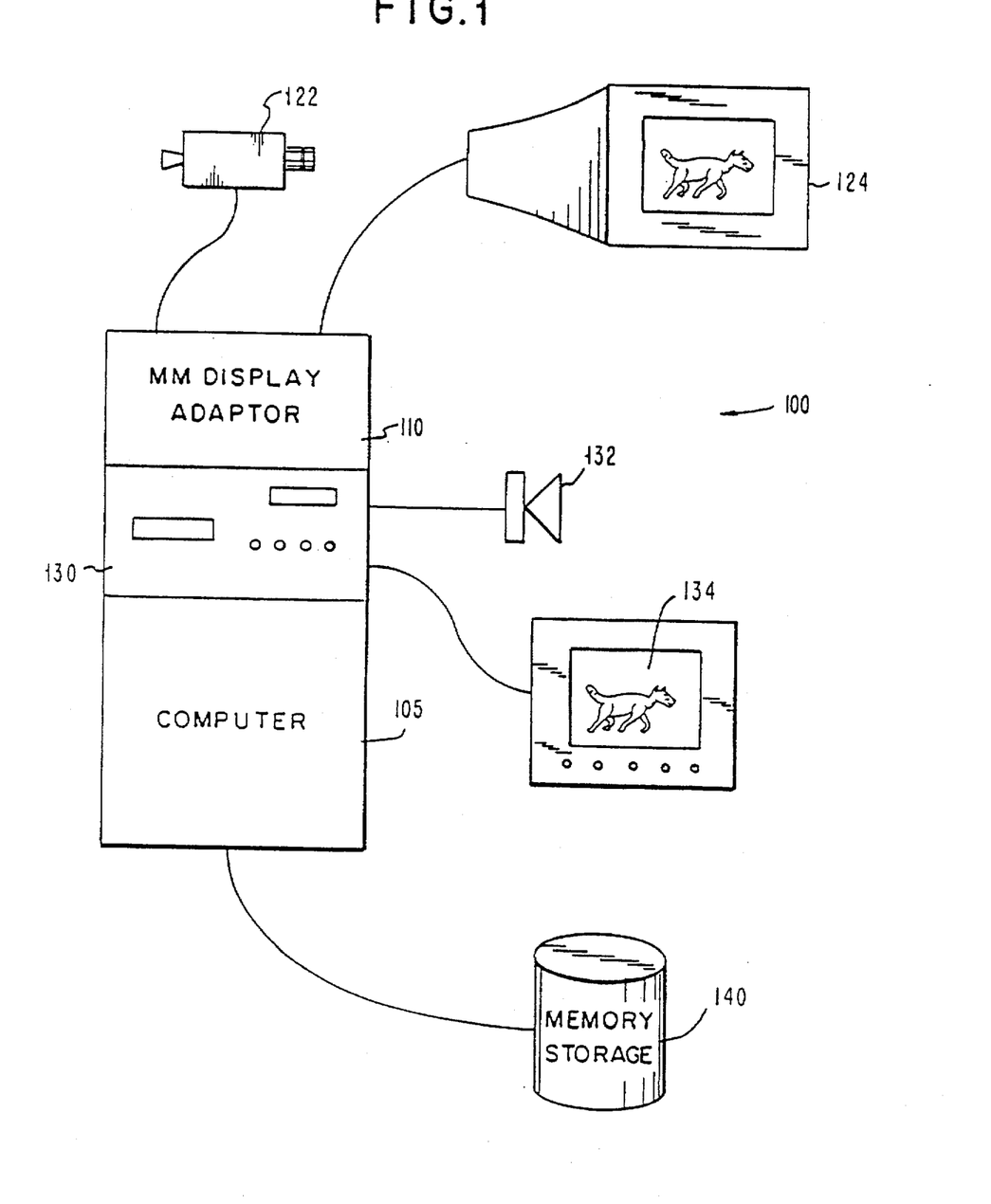
FIG. 1 is a block diagram of one preferred computer system with multimedia inputs and outputs that uses the method of the present invention.

Selecting the episodes 210 that comprise a story is the first step in creating a story. In a typical multimedia system 100, one or more memory storage components 140 will contain a plurality of multimedia segments. As stated above, these segments have some sensory quality(ies) that can be played (displayed) 134. Most often it is the system user that determines the selection of some or all of the segments 210. Commonly known methods, like keyboard entries or point and click selection, can be used to assist the user in the segment selection. However, it is conceivable that multimedia segments of a story can be selected by some other external device, e.g., a computer or computer program, that performs the selection 210 based on some criteria. For example, a user (or external device) might select all the multimedia segments in the memory storage component 140 that are film clips of sunny places.

Once the user has selected 210 the multimedia segments that are to be part of the story, the user defines the story by scheduling how the selected segments (now called episodes) are to be played 220. Any of the many known methods for scheduling multimedia episodes to define a story may be used to schedule the playing of the story episodes.

Figure 3:
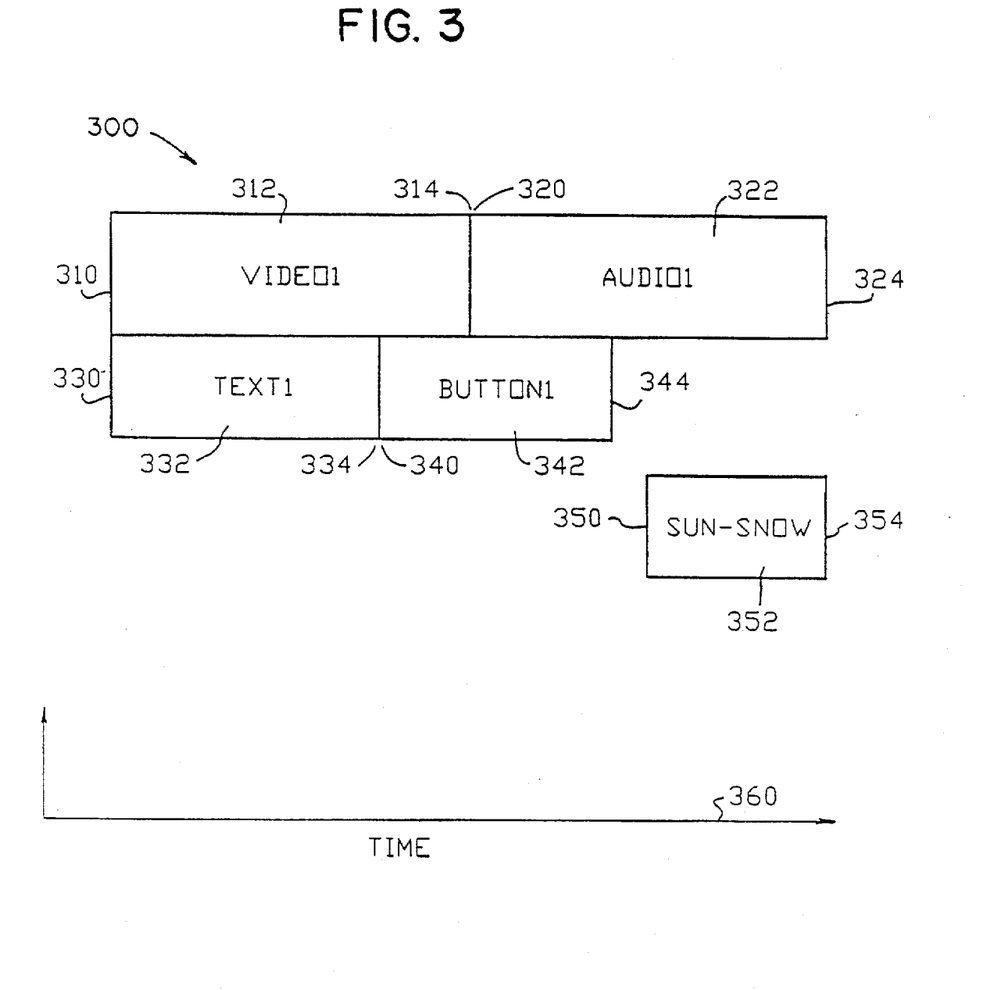
FIG. 3 shows an example of a preferred way (i.e., a temporal layout) of scheduling selected multimedia episodes in order to define a story.

One preferred embodiment for scheduling story episodes uses a temporal layout. FIG. 3 shows an example of a temporal layout 300 with five selected multimedia episodes: video1 312, audio1 322, text1 332, button1 342, and sun-snow 352. Video1 might be a visual clip or movie of some particular event that is played (displayed) by the multimedia system 100 starting 310 at a point in time of a time line 360. Video1 ends 314 at a later point in time on the time line 360 and therefore has a duration 312 that lasts between its start 310 and end 314. (The time line 360 can be established by some counter or clock in a computer program running on the system 100. Other means, like the system 100 operating system or clock, that are commonly used to provide timing signals can also be used.) In similar manner, audio1 322 can be an audio clip with a start 320, duration 322, and end 324; text1 can be some displayed textual information with a start 330, duration 332, and end 334; button1 can be a screen selectable button icon with a start 340, duration 342, and an end 344; and sun-snow can be a video clip showing a snow covered mountain on a sunny day with a start 350, duration 352, and an end 354. The temporal layout 300 defines the story by establishing at what point in time each of the story episodes play, i.e., when each story episode starts and ends and, therefore, how long each episode lasts (duration). In other words, the story is defined in the temporal layout 300 by relating the story episodes (312, 322, 332, 342, and 352) with a time schedule.

Further examination of the temporal layout 300 shows how the story episodes (312, 322, 332, 342, and 352) are related by the temporal layout 300 to define a story. Video1 312 and text1 332 both start (310 and 330 respectively) at the same point in time 360. This means that the video1 312 visual clip will be displayed along with the text1 332 text for the duration 332 of text1. After text1 332 ends 334, button1 342 will appear on the display along with the video1 312 visual clip until video1 312 ends 314. At this point 314, audio1 322 will start 320 playing along with the visual display of button1 342. At some point prior to audio1 322 ending 324, button1 342 will end 344. Audio1 322 will then play alone until sun-snow 352 starts 350. Audio1 322 and sun-snow 352 both end at the same time (324 and 354 respectively.) (The starting point 350 in time of sun-snow 352 can be determined by knowing the end 354 and duration 352 of sun-snow 352.)

Figure 4:
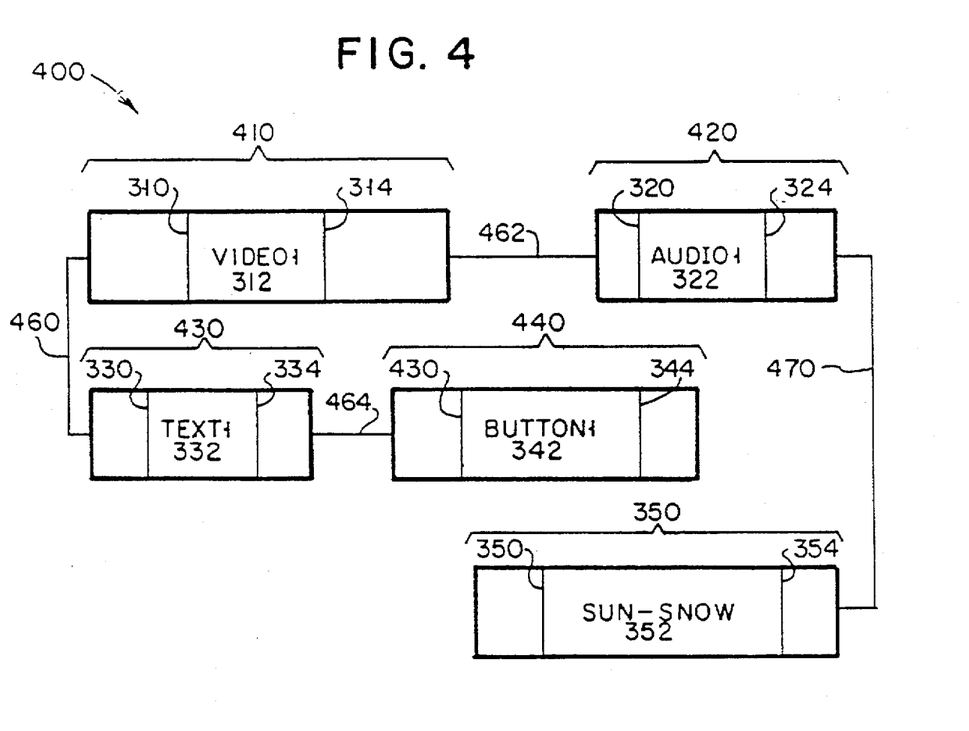
FIG. 4 shows a more preferred temporal layout that schedules selected multimedia episodes by using relationships among the episodes.

FIG. 4 is a more preferred embodiment of a temporal layout 400. In this temporal layout 400, video1 312, audio1 322, text1 332, button1 342, and sun-snow 352 are the same multimedia episodes as described in FIG. 3. These episodes also have starts, durations, and ends as described (and numbered) above. However, in this temporal layout 400, the starts, durations, and ends of each episode can vary within a certain window. For example, the episode video1 312 has a start 310, duration 312, and end 314 that can vary within the time period defined by window 410. In like manner, audio1 322 has a start 320, duration 322, and end 324 that can vary within the time period defined by window 420; text1 332 has a start 330, duration 332, and end 334 that can vary within the time period defined by window 430; button1 342 has a start 340, duration 342, and end 344 that can vary within the time period defined by the window 440; and sun-snow 352 has a start 350, duration 352, and end 354 that can vary within the time period defined by the window 450.

Being able to define a story (hyperstory) as in the temporal layout 400 of FIG. 4 gives a user much more flexibility when designing, changing, and creating multimedia documents because not all of the story episodes have to have their starts, durations, and ends tied to a specific point in time as given by the time line 360 (e.g., a clock). For instance, a story episode like video1 312 would have the flexibility to play for as short as 15 seconds or as long as 35 seconds without effecting the design or creation of the remainder of the story. However, for just this reason, it is much more difficult to organize the episodes of the story (hyperstory) since a change in the start, duration, or end of any one episode can change the points that one or more story episodes start and end in time, unforeseen clashes can develop.

The present invention uses a novel approach to scheduling multimedia episodes to permit one or more of the story episodes to be scheduled in relation to other episodes in the story rather than in relation to a time line 360. To establish these interepisode relationships, the set of story episodes is defined as: $m_i$, where i represents a given story episode in the set of n story episodes, i.e., i=1, 2, . . . , n. Note that since the duration of the episode $m_i$ defines the existence of the episode, the term $m_i$ will designate both the episode and its duration. Given the members of the set of story episodes, $m_i$, the present invention establishes relationships among set members (episodes) by using three constraints:

1. start ($m_i$, . . . , $m_n$): which designates the episodes, $m_i$, . . . , $m_n$, that share the same beginnings, 2. finish ($m_i$, . . . , $m_n$): which designates the episodes, $m_i$, . . . , $m_n$, that share the same ends, and 3. meet ($m_i$, . . . , $m_n$): which designates the episode(s) $m_i$ that shares its end with the beginning of episode(s) $m_n$.

Note that the arguments of constraints 1 and 2, i.e., start( ) and finish( ), can be in any order. Also dummy episodes can be used, i.e., an episode, $m_i$, can have a non-zero duration but have nothing to play (display). A dummy episode might be used to cause a time delay. Furthermore, these constraints can be used with known methods to determine the start, duration, and end of a given episode. For instance, given the start of episode $m_i$, start($m_i$), and the end of episode $m_i$, end($m_i$), the duration of $m_i$, duration($m_i$), can be determined as:

$$\text{duration } (m_i) = \text{end}(m_i) - \text{start } (m_i).$$

An episode, $m_i$, is within a story, S, if its duration is within the time that the story is played.

A forth constraint, the "follows" constraint, is useful to define when dealing with episodes like text or still images that have no fixed duration. The term "follows($m_s, m_m$)"

establishes a masterslave relationship between $m_m$, the master, and $m_s$, the slave. For example, an episode containing text can be designated as a slave to a video clip, the master, and be given the duration (or other attributes) of the master.

Applying these constraints to the temporal layout 400 of FIG. 4, start(video1,text1) establishes a start relationship 460 between episodes video1 312 and text1 332 constraining them to both start at the same time. Meet(video1,audio1) establishes a relationship 462 between episodes video1 312 and audio1 322 that causes audio1 322 to be played (started 320) immediately following the end 314 of video1 312. In like manner, meet(text1, button1) establishes a relationship 464 between episodes text1 332 and button1 342 that causes button1 342 to play (start 340) immediately after text1 332 ends 334. Finally, finish(audio1, sun-snow) establishes a relationship 470 between episodes audio1 322 and sun-snow 352 that causes both episodes to end (324 and 354 respectively) at the same time. Given these relationships among the story episodes and some other episode characteristics, the temporal layout 400 completely defines the story. For example, the durations of the story episodes might be given as follows: duration(video1)=13 seconds, duration(audio1)=8 seconds, duration(text1)=7 seconds, duration(button1)=5 seconds, and duration(Sun-snow)=10 seconds. With this information, the relationships among the story episodes, and a relative point on the time line (i.e., when the story starts), the starts and ends of all the story episodes can be determined relative to the time line 360 by techniques well known in the art. Alternatively, by defining the episode relationships, starts and ends (or a combination of starts, durations, and ends), the episode durations (remaining temporal layout information) can be determined. By using this determined information, a temporal layout like that in FIG. 4 can be reduced to a temporal layout like that in FIG. 3.

One skilled in the art given this disclosure could develop various alternatives to define stories using episode scheduling and/or temporal layouts that are within the scope and contemplation of this invention.

Figure 5:
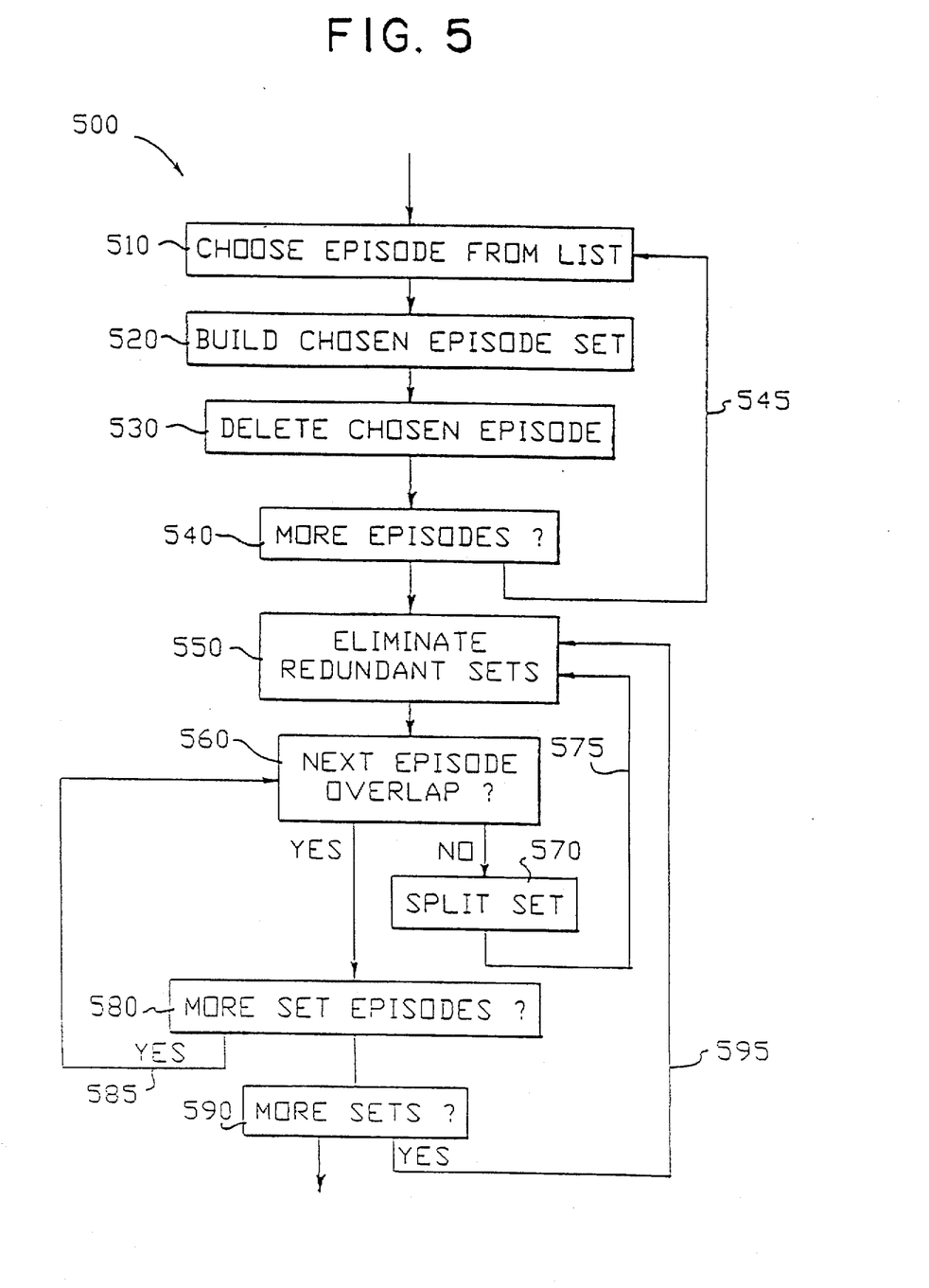
FIG. 5 is a flow chart showing a preferred embodiment of a method of grouping story episodes into temporal cliques.

Referring back to FIG. 2, box 230 shows the step of grouping the story (hyperstory) episodes into temporal cliques which is a novel step of the invention that allows separating the story into one or more groupings that can be spatially organized 240 independent of one another. A preferred method 500 of grouping the story objects into temporal cliques is shown in FIG. 5 which will be explained along with an example shown in FIG. 3.

FIG. 3 shows a temporal layout of five story episodes: video1 (v) 312, audio1 (a) 322, text1 (t) 332, button1 (b) 342, and sun-snow (s) 352 which will be designated in the following discussion by their respective letters in parenthesis. The method in FIG. 5 begins by listing all the desired episodes, e.g., all the episodes in the story and choosing 510 an episode from the list. For example, from the list, or set, of story episodes (v, a, t, b, s), the episode v is chosen.

In the next step 520, an episode set (or subset of the original list) is built by determining all the episodes in the story (list) that overlap with the chosen episode. (v is the chose episode during this pass 545.) Overlap of the episodes in the story can be determined by any of a number of known methods. For instance, a story episode overlaps a chosen story episode if the start of the story episode exists at any point in time during the duration of the chosen story episode. Alternatively, the episodes overlap if the end of the story episode exists at any point time in during the duration of the chosen episode. One skilled in the art given this disclosure could come up with other methods of determining episode overlap that are within the contemplation of the present invention. Each episode that overlaps the chosen episode becomes a member of the chosen episode set. Note that the chosen episode set is a subset of the original list. This subset could include all the story episodes.

In step 530, the chosen episode is deleted from the list and in step 540 the list is checked again to determine if there are more episodes on the list that have not been chosen. If there are, the next episode on the list is chosen and the method returns 545 to step 510. It will be appreciated that one skilled in the art given this disclosure could develop various ways to build an episode set for each of the episodes in the story (steps 510 through 540) that are within the scope and contemplation of the present invention. For instance, an algorithm can be devised that chooses the first episode in the set of story episodes, determines the story episodes that overlap the chosen episode to create an episode set, indexes to chose the next story episode, and builds episode sets for each story episode until all the story episodes have been chosen.

An example of building story episode sets is now presented using the temporal layout of a story defined in FIG. 3. First episode video1 312 is chosen (step 510). Episodes text1 332 and button1 342 overlap the chosen episode. Thus the episode set v: {v, t, b} is built (step 520). Video1 312 is deleted from the list (step 530). There are more episodes (540, 545) so the next one, audio1 322 is chosen (step 510). Button1 342 and sun-snow 352 overlap audio1 322. Thus the episode set a: {a, b, s} is built (step 520). Button1 342 is deleted (step 530) and since there are more episodes on the list (540) another is selected (step 510), i.e., text1 332. Video1 overlaps text1 and the episode set, t: {t, v} is built (step 520). Note that the story episodes are not deleted for episode set building. This process continues until all the episode sets are built (step 520). For the temporal layout in FIG. 3, the episode sets are:

v: {v, t, b} a: {a, b, s} t: {t, v} b: {b, v, a} and s: {s, a}

In one preferred embodiment, the redundant episode sets of the story are removed, step 550, once all the episode sets of the story are derived. In alternative embodiments, the removal of redundant sets 550 can be perform at any point in the method or not at all. For instance, a check may performed for episode set redundancy each time a set is built 520. Redundancy means that one episode set is identical to or subsumed by (a subset of) another episode set. In this example, set "t" is redundant with set "v" (it is subsumed). Therefore set "t" is removed.

The method proceeds to determine if all the episodes in each episode set overlap all the other episodes in their set. In step 560, the next episode in a given episode set is checked to determine if it overlaps with all the other episodes in the set. If it does, the episode set is examined for episodes that have not been tested for overlap (step 580). If there are unexamined episodes, the overlap (of all other episodes in the episode set) is checked by repeating 585 step 560. After every episode in the episode set is examined and overlaps every other episode in the set, it is determined if there are any more story sets that have not been evaluated, step 590. If there are, the method returns to the redundancy check in step 550 and then starts the evaluation again with the overlap check of step 560. In an alternative embodiment, the method can return directly to step 560. If step 590 determines that all the episode sets have been evaluated, the method ends and all of the story episodes have been grouped into temporal cliques, box 230 of FIG. 2.

Each time the overlap check of step 560 determines that an episode in an episode set does not overlap with every other episode in the episode set, the episode set is split, step 570, and the method returns to redundancy check (step 550) or alternatively directly back to the overlap check of step 560. When a episode set is split in step 570, two new episode sets are created from the episode set that is split. An initial episode set is split so that a first new set contains the episodes of the initial episode set that overlap the episode being checked (include the checked episode itself). The other new episode set contains the episodes in the initial episode set without the episode being checked. These two new episode sets are treated as not evaluated episode sets until they are evaluated (steps 560, 570, and 580).

To further illustrate this method 500, the example using the temporal layout shown in FIG. 3 is continued. After the "t" set was eliminated as being redundant 550, the following episode sets remain:

v: {v, t, b}
a: {a, b, s}
b: {b, v, a} and
s: {s, a}.

Evaluation of set "v" begins 560 by insuring that the second episode, t, in the set overlaps with all other episodes in the episode set. It does not, therefore the set must be split 570. The new sets comprise a first episode set that includes episodes in the initial episode set "v" that overlap "t" (including t), i.e., episode set va: {v, t}. The second episode set comprise the episodes in the initial episode set "v" without "t" because it does not overlap all the episodes in the initial set, i.e., episode set vb: {v, b}. Having evaluated the initial episode set "v" (there are no more initial set episodes 580 because the set is deleted after the split), it is determined that there are more sets not evaluated 590 and the next episode set ("a") is picked 590. Episode set "vb" is redundant 550 because it is subsumed by episode set "b" and is therefore deleted. In step 560, the episode set "a" is evaluated. The second episode of the set, b, does not overlap the other episode of the set, s. Therefore, episode set "a" is split 570. Using the criteria stated above, episode set "a" is split into new episode sets aa: {a, b} and ab: {a, s}. There are no more episodes in the set 580 (set "a" has been split/deleted) but there are more episode sets 590 so the next episode set "b" is picked for evaluation 590. Episode set aa: {a, b} is subsumed by episode set "b", is therefore redundant and deleted 550. In like manner episode set ab: {a, s} is equivalent to episode set "s", therefore episode set "ab" is redundant and deleted 550. Following the same method, episode set "b" is split 570 into new episode sets ba: {b, v} and bb: {b, a}. The next episode set "s" is picked 590. Neither of the episode sets "ba" or "bb" is redundant 550 so they are retained. All of the episodes in episode set "s" overlap one another (560, 580) so no splitting is required. (The episode set "s" is also not redundant 550.) Step 590 continues selecting the remaining episode sets (in this example the remaining episode sets are new ones created from splits) until there are no more episode sets in the story. In this example, the remaining episode sets each have episodes that overlap one another and none are redundant. When there are no more episode sets remaining 590, the method ends and the story episodes have been grouped into temporal cliques, i.e., the final groups of episode sets. In this example, the four temporal cliques are:

va: {v, t}
ba: {b, v}
bb: {b, a} and
s: {s, a}.

These temporal cliques represent the four groupings of story episodes that can be spatially organized independent of one another. Specifically, the story defined in the temporal layout of FIG. 3 can be played with four screens, one for each temporal clique, without any story episode clashing with another. In this example, the first screen would play the episodes video1 and text1 together, the second screen would play video1 and button1 together, the third screen would play audio1 and button1 together and the forth screen would play audio1 and sun-snow together. It will be appreciated from this simple example that stories with a large number of episodes, e.g., more than 25, would be very difficult to play without clashes without using the present method.

Returning to FIG. 2, the episodes in temporal clique are spatially organized together independent of the spacial organization of the episodes in the other temporal cliques, step 240. There are many known methods for spatially organizing general shapes on a display. Any of these can be used as a preferred embodiment. If the temporal clique contains a small number of episodes, placement of the episodes on the display can be straight forward and can be accomplished manually. However, if there are a large number of episodes in the clique and/or if the cliques are disjointed, i.e., more than one clique can have common episodes, the spacial organization can become more complex. Note that the following discussion refers to the spacial organization of visual displays without intending to lose the generality of the invention. For instance, audio clips may be played in some relationship with visual episodes. Furthermore, audio clips can be "spatially organized" together by adjusting properties like sound level.

Grouping the story episodes into temporal cliques 230 has reduce the problem of organizing the story episodes into a number of spacial organizations, i.e., one for each temporal clique. In one preferred embodiment (see FIG. 6), the spacial organization for each clique is performed by an iterative 630 two step method 600. The first step places the clique episodes in an initial position 610 and the second step negotiates the space requirements among the clique episodes 620.

Figure 6:
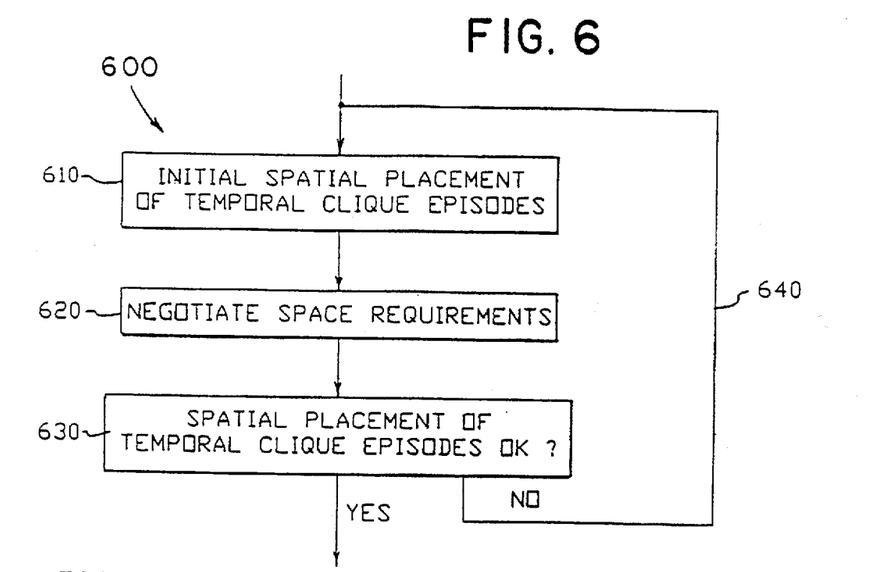
FIG. 6 is diagram showing a preferred way of spatially organizing episodes of a temporal clique.

To establish an initial position of the clique episodes, certain spatial constraints can be used. For instance, each episode can be assigned a particular shape (e.g., rectangular), minimum display area, and range of aspect ratios. Furthermore, relative placement constraints can be provided. For example, certain episodes may be required to be positioned with respect to one or more other episodes, e.g., to the right and above. Alternatively, some episode may be required to be positioned at a certain location on the screen, e.g., in the lower left corner. This information can be provided by the user by various known input means, like point and click with a mouse or keyboard. Relative placement constraints also can be provided as defaults. As an example, at the time of initial placement, an episode may be required to occupy its minimum area requirement in order to retain enough display area to accommodate the sum of the areas needed by all the episodes in the temporal clique.

The initial placement 610 of the episodes in the temporal cliques may not be a desirable one, e.g., in the initial layout there may be overlaps (in space) or undesirable spaces among the episodes. With a large number of episodes in the temporal clique being spatially organized, the space requirements of one or more episodes may need to be negotiated.

This negotiation 630 may be done manually by the user with known graphical interfaces or automatically. A preferred method for automatically laying out shapes spatially is called the "force" method and is described in U.S. Pat. No. 5,398,195 to Kim, filed on Feb. 21, 1992, and entitled "Method and System for Providing a Non-Rectangular Floor Plan", which is herein incorporated by reference in its entirety.

The force method is useful in the VLSI floor planning process where a given number of rectangular blocks (although other shapes can be used) are positioned on a computer circuit layout. The method can be directly applied to spatial layouts of shapes on a display. Given an amount of spatial overlaps between two or more rectangular blocks, the method computes a set of "repelling forces" and uses these forces either to move the shapes away from one another or to reshape them within the specified range of aspect ratios and minimum area requirements. When there are spaces between two or more shapes, the method also computes "attracting forces" between the blocks based on how much empty space is between the shapes. The attracting forces are used to guide the repelling forces.

In the case where one or more episode are disjointed, i.e., the episode is grouped in more than one temporal clique, the spatial layout problem is in some sense similar to the problem of assigning seats to passengers on a non-direct flight. Some passengers may travel through to the final destination, and some may get off/on at intermediate destinations. However, once the seats are assigned to a passenger, the passenger is expected to remain in the seat for the duration of their journey. Thus, one preferred embodiment detects disjointed episodes, e.g. by determining if the episode is a member of more than one clique, and assigns the disjointed episode a fixed spacial location on the display. An episode that has an assigned position does not participate in the negotiation process. The episode with an assigned position forces other episodes to place themselves around it if possible.

The process of automatically obtaining a spatial layout is not guaranteed to deliver a solution because the constraints the user has imposed on the placement may be impossible to satisfy. The algorithm can detect such inconsistencies, and the user may repeat 640 the initial placement 610 and negotiate 620 a new cycle with a new set of constraints until a desirable design is found. Note that reassigning a temporal ordering (temporal layout) may be part of the iterative process 630.

Figure 7:
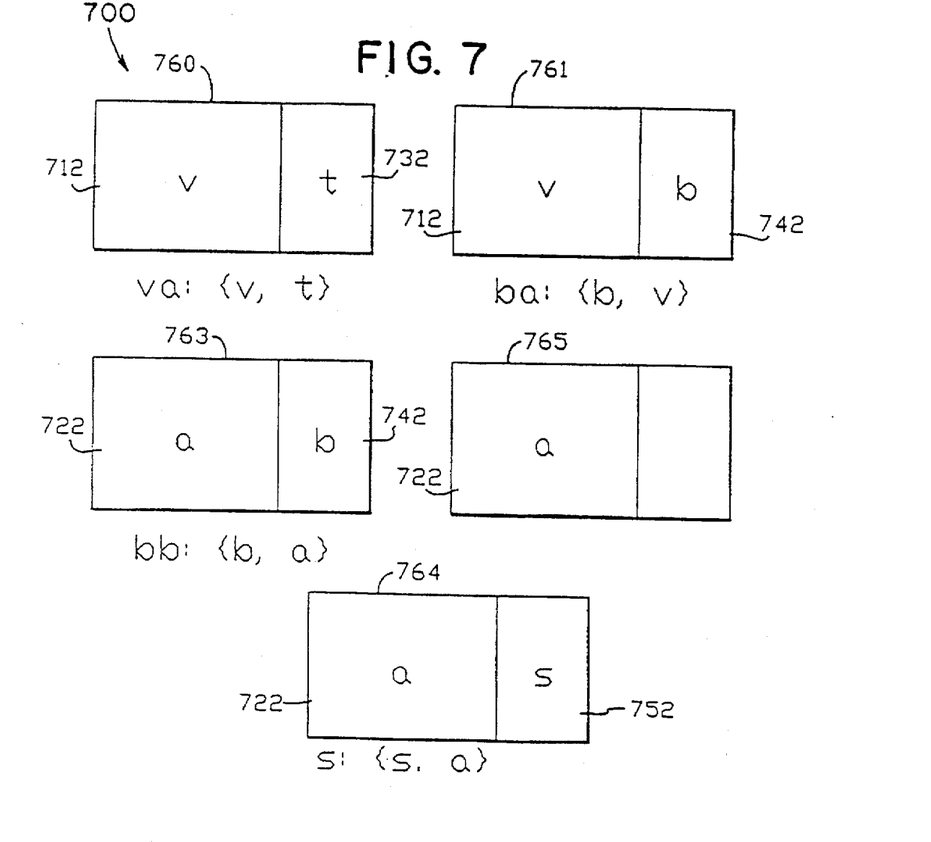
FIG. 7 is an example of temporal cliques being spatially organized.

FIG. 7 gives an example of one possible set of spacial layouts 700 that was developed for the example of FIG. 3. Spatial layouts (or displays) 760–764 represent four spacial organizations of the FIG. 3 example developed from the discussion of steps 230 and 240 above. Spatial organization 760 is associated with temporal clique "va", as spatial organizations 761, 763, and 764 are associated with temporal cliques "ba", "bb", and "s", respectively. Episodes video1, displayed as 712, and audio1, displayed as 722, are disjointed episodes in that they belong to more than one temporal clique. Therefore, episode video1 712 is displayed in the two screens 760 and 761 associated with the temporal cliques of which it is a member and episode audio1 is displayed on screens 763 and 764, associated with the temporal cliques of which it is a member. (See below discussion of screen 765.) As discussed in one preferred embodiment of the spatial organization step 240 (above), once disjointed episodes are given a spatial position, they retain it if possible and the other episodes in the temporal clique are organized around them.

Note that the method has given a "spatial" organization to all the cliques in the story defined by the temporal layout 300. This "spatial" organization includes the episodes that are not displayed on a visual display, like audio1. It will be noted in this example that the spatial organization step 240 will produce visual displays that will have "blank" spots during the times that audio1 is playing. (This is because the spatial organization of the method includes and "spatially" organizes episodes that are not visual.) It is up to the user/designer to decide if this is acceptable. If not, the user/designer can select 210 an additional video clip, e.g., a still picture 722, that is played along with audio1 322. This newly selected video clip can have the exact time duration as audio1 322 on the temporal layout 300. Therefore, its addition would not change the results of the method 200. The newly selected video clip, e.g., the still picture, will be displayed on the visual display during the time that audio1 322 is playing. This could occur, at the user/designer option, in the spatial layouts (visual displays) 763–765.

Note that the spatial organization or display 765 is not associated with a temporal clique. This is because there is only one episode in this display 765. This episode 722 is actually subsumed by the previous temporal clique 763 and can be looked at as a continuation of this clique with one episode, button1 742, turned off. Situations like this present no problem to the present method because single episode displays like 765 are trivial to spatially organize 240.

Referring again to the method 200 in FIG. 2, the entire story defined by the temporal layout 300 can be played without episode clashes 250. This is accomplished by playing the episodes of each temporal clique together in the order or sequence defined by the spacial layout 300 of the story. For example, video1 and text1 are played together according to the spacial organization of temporal clique "va" 760 during the time that both video1 310 and text1 332 overlap as determined by the temporal layout 300. When text1 332 ends 334, video1 312 and button1 342 are played together according to the spacial organization 761 of temporal clique "ba" while video1 312 and button1 342 have common durations (i.e., until video1 ends 314) as defined by the temporal layout 300. Then audio1 322 and button1 342 play together according to the spacial organization of temporal clique "bb" 763 while those episodes have common durations (button1 ends 344) on the temporal layout 300. Afterwards, audio1 322 plays alone (there is no spacial organization needed for one episode) until sun-snow 352 starts 350 and plays with audio1 322 for their common durations until they both end (324 and 354 respectively.) Audio1 322 and sun-snow 352 play together according to the spacial layout of temporal clique "s" 764.

Since the novel features of the present invention enable separating story episodes into temporal cliques that can be spacial organized separately from other temporal cliques in the story, the present invention also enables asynchronous playing, i.e. calling or branching to other stories from within (or after the finish of) a given story. A call or branch can be done to any other story organized by the present method without accounting for the clashes that could occur with the episodes within the called (or branched to) story. Using this capability of the present invention satisfies a long felt need in the design, construction, organization, and playing of multimedia documents, i.e., the need to connect a plurality of smaller multimedia stories together to form a larger multimedia document or hyperstory.

The creation of hyperstories is enabled because the present invention separates the episodes of the stories in the hyperstory into temporal cliques that are spatially organized independent of one another. Accordingly, a story can be played temporal clique by temporal clique without any episode clashes 250. In like manner, temporal cliques of different stories can be sequentially played 250 in random order without clashes because story episodes within the temporal cliques are spatially organized independently of the episodes within the temporal cliques of the other stories in the hyperstory. Therefore, any branch or call to a story within the hyperstory, or even a call (branch) from or to a point within a story within the hyperstory, initiates the clashless playing of the episodes of the called (branched to) story because that story has its episodes spatially organized by the present method 200. This enables the design, creation, organization, and playing of very large multimedia documents, hyperstories, that could not be efficiently accomplished, if at all, by prior art methods.

Figure 8:
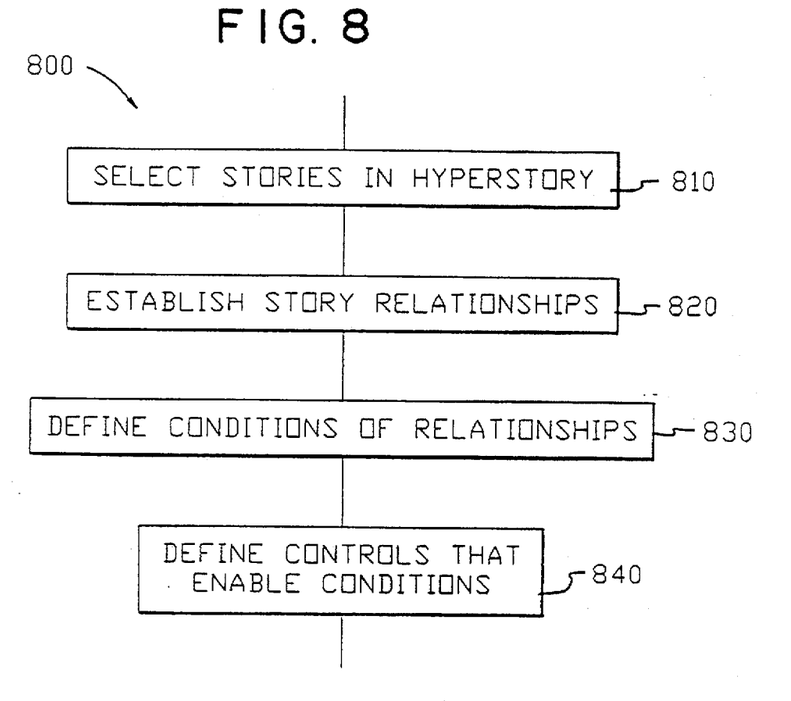
FIG. 8 is a flow chart showing the steps of creating a hyperstory.

FIG. 8 is a flow chart showing one preferred method 800 of designing/using a hyperstory. Design of a hyperstory requires the following: a set of stories (selected by the designer or user) 810; a set of relationships among the stories in the hyperstory 820; a set of conditions for the asynchronous events 830; and a set of controls that initiate asynchronous events like interrupts, calls, and branches 840.

As stated, the set of stories in the hyperstory is determined by the hyperstory designer/user. The designer/user selects a plurality of stories that has been temporally and spatially organized by the present method 200. The hyperstory designer/user next establishes a set of relationships among the stories in the hyperstory. This is done using well known methods in the art., e.g. directed graphs, more specifically petri nets.

Figure 9:
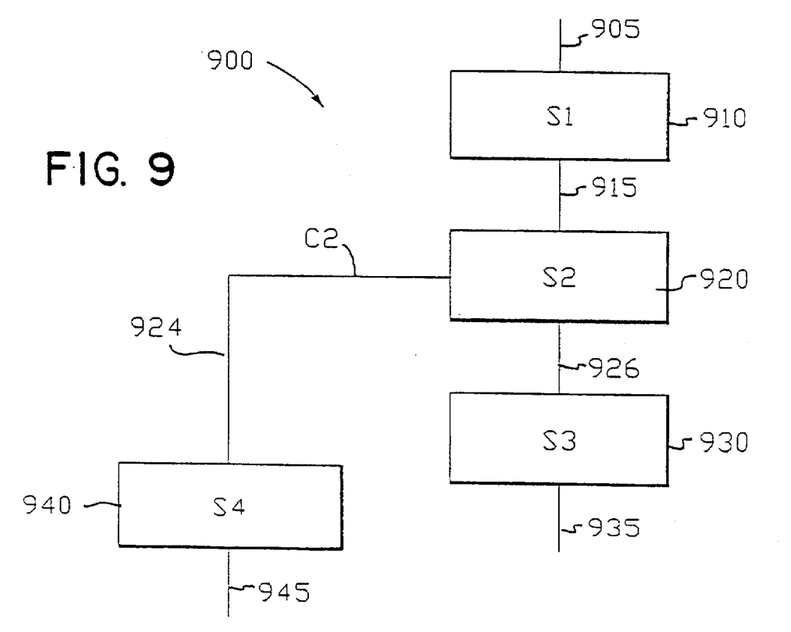
FIG. 9 is a drawing of a directed graph (petri net) used in establishing story relationships within a hyperstory.

FIG. 9 is an example of a directed graph 900, e.g. a petri net, that is used to establish (asynchronous) relationships 820 among multimedia stories in a hyperstory. The nodes of the directed graph (petri net) 910, 920, 930, and 940, are the stories that were selected by the user/designer in step 810 in FIG. 8. The edges or arcs 905, 915, 924, 926,935, and 945 of the graph 900 (petri net) represent the conditional relationships among the stories of the hyperstory represented on the graph 900. These asynchronous relationships can be looked at as conditional links between stories of the hyperstory, i.e., the connection (like a call or branch) that can be controlled or established by some "condition" 830 that is created by the designer/user. The conditions can be dynamic in that they can be triggered by some computation indicating condition satisfaction. The links can be invoked, changed, or ignored without changing the temporal and spatial layout of the stories in the hyperstory. This feature is enabled by the present invention because the temporal and spacial organization of the story (hyperstory) episodes is separated by the present method 200 from the changing asynchronous relationships.

The established story relationships 820 and the conditions of those relationships 830 are now further defined using the directed graph 900 as an example. Arc 905 is a condition that has been satisfied to start story S1, graph node 910, playing. Upon completion of S1 playing, the condition to start story S2 playing (graph node 920) is satisfied, as shown as arc 915, and S2 starts playing. In similar manner, if story S2 finishes playing, the condition (arc 926) to start story S3 (graph node 930) is satisfied and story S3 starts to play. This process continues after story S3 plays as indicated by the arc 935. However, if some external or asynchronous condition, C2, occurs while the story S2 in graph node 920 is playing, control is switched to arc 924, e.g., story S4 (graph node 940) starts to play. When story S4 finishes, the condition of arc 945 is satisfied and the next action designed by this arc 945 is performed.

Note that the arcs 915, 924, 926, 935, and 945 transfer control in the graph and can have their conditions for transfer satisfied by the finishing of the preceding story or by some condition, C2, occurring before the story finishes. For example, control can be transferred out of a story node after one of the intermediate temporal cliques in the story is played and before the story finishes play. Furthermore, some external event or interrupt, like the pressing of a button could stop the play of a story in the middle of the story and begin playing another story. Also, transfer of control does not have to be to the beginning of a story but could start at any temporal clique within the story being called (branched to). All these events can occur without episode clashes because the spatial organizations of all the episodes in the stories (hyperstory) are done in temporal cliques, independently of the spatial organizations of the other temporal cliques in the hyperstory according to the method 200 of the present invention.

Note further, that because of the present method 200, each node on the directed graph 900 (petri net) could be a hyperstory. For these same reasons described above, the hyperstory nodes can be played asynchronously as defined by the graph 900 without episode clashes. Thus using the present method, even larger multimedia documents can be created, organized, and played without clashes.

The condition, C2, causing the arc 924 to transfer control is defined in step 830 of the method 800 for building a hyperstory. There are many ways for establishing story relationships 820 and conditions 830 in the prior art and any of these methods can be used. Two preferred definitions are now presented, the branch and the call. The branch is defined as: branch($s_i$, $c_i$, $s_j$): if $s_i$ is active (playing) and $c_i$ holds true (is satisfied), then $s_i$ is terminated and $s_j$ is made active (plays).

The call is defined as:
call($s_i$, $c_i$, $s_j$): if $s_i$ is active (playing) and $c_i$ holds true (is satisfied), then $s_i$, is put on hold (temporarily finishes playing) and $s_j$ is made active (plays). However, upon the termination of $s_j$ (when it finishes playing), $s_i$ becomes active (starts playing again) where it left off.

In these definitions, $s_i$ is the story (or hyperstory or temporal clique within a story) represented by a node, e.g., 920, in the directed graph 900 that is calling or branching to another node 940 (story, hyperstory or temporal clique within a story), $s_j$, in the graph 900. "$c_i$" is the condition or set of conditions, C2, that must be satisfied before the call or branch can occur.

The defined conditions 830 can be any typical condition that is known in the art. For example, a condition could be that a story or temporal clique within the story finishes playing. A set of conditions might include a certain time on the system clock and the pressing of a control, like a button. (Note that the condition provided by the system clock is considered asynchronous because it occurs outside of the temporal story definition of the temporal layout 300.) These conditions or condition sets can be periodically checked to determine if they are satisfied. Because these conditions can be asynchronously changed and as a result alter the playing of the document (hyperstory), the playing of the document can be dynamically altered by the definition and occurrence of these conditions. For example, the sequence of stories in the hyperstory that are being play can be altered by the pressing of button.

Controls that enable conditions 840 are also well known in the computer arts. These controls might include hard or soft keyboard keys, touch screen buttons, switches, hardware interlocks, relays, etc. For example, button1 342 could be a hardware button or a button on a touch sensitive screen. If a condition $c_i$ (or C2 in FIG. 9) is defined as the "closed" state of button1, story S4 (910) will be played after story S2 (920) instead of story S3 (930).

The present invention can be used in many applications. For example, by defining button controls 840 that branch to certain sections of the document and by identifying the button by the location of the branch in the document, a series of controls (buttons) 840 can be defined 830 that enable browsing through different locations in a multimedia document much like tabs in a book. By using the present invention to organize and display multimedia information, computer systems can be built that present large quantities of information. For example, large multimedia documents can be used in the field of education to teach people about any number of subjects.

Given this disclosure one skilled in the art could develop many equivalent embodiments of this invention that are within the contemplation and scope of the invention.

I claim:

1. A method of organizing multimedia segments, the multimedia segments having one or more sensory qualities when played on a multimedia computer system, the multimedia segments being stored on a memory of the computer system, and the multimedia segments being organized to play on the computer system, the method being executed by the computer system and comprising the steps of:

selecting one or more multimedia segments from a plurality of segments, the selected segments each having a temporal component including a start, an end, and a duration, the selected segments being episodes of a story;

scheduling the story episodes in a schedule sequence that defines the story; grouping the story episodes into one or more temporal cliques, each of one or more first episodes in each temporal clique overlapping one or more of the other episodes in the temporal clique by having any one of the start and end of the first episode scheduled at a time in the schedule sequence that is the same as any one of the start, end, and duration of at least one, but not all, of the other episodes in the temporal clique, at least one of the temporal components of at least one of the first episodes being different than the respective temporal component of one or more of the other episodes;

spatially organizing the episodes in each temporal clique independently of the episodes in other temporal cliques, the spatial organizing placing any of the first episodes in the temporal clique in a spatial organization so that the first episode does not clash with any of the other episodes in the temporal clique when the episodes in the temporal clique are played, a clash occurring when a first multimedia segment plays at the same time as one or more other multimedia segments and the first multimedia segment interferes with the one or more of the other multimedia segments; and playing the episodes of the story in the schedule sequence with the spatial organization of the temporal cliques.

2. A method of organizing multimedia story episodes, as in claim 1, where the schedule sequence is a temporal layout.

3. A method of organizing multimedia story episodes, as in claim 2, where the temporal layout schedules the episodes in the schedule sequence according to one or more relationships among the episodes.

4. A method of organizing multimedia story episodes, as in claim 3, where one or more temporal cliques is spatially organized by initially placing the episodes in the temporal clique in an initial spatial organization and then negotiating one or more space requirements among the episodes to obtain a final spatial organization.

5. A method of organizing multimedia story episodes, as in claim 3, where the spatial organization is done by a user using a graphical interface.

6. A method of organizing multimedia story episodes, as in claim 3, where the spatial organization of one or more temporal cliques is played by being displayed as a visual display of the computer system.

7. A method of organizing multimedia story episodes, as in claim 6, where the visual display is a computer screen.

8. A method of organizing and playing two or more multimedia stories as a hyperstory, the hyperstory being two or more multimedia stories organized to play on a multimedia computer system, the method being executed by the multimedia computer system and comprising the steps of:

creating two or more multimedia stories by selecting one or more multimedia segments, the multimedia segments having one or more sensory qualities when played on the multimedia computer system, the multimedia segments being stored on a memory of the computer system, and each of the selected multimedia segments being a story episode of a set of story episodes comprising of one of the stories;

scheduling the story episodes of each of the stories according to a temporal layout that defines the story;

grouping the story episodes of each story into one or more temporal cliques, each of one or more first story episodes in each temporal clique of the story overlapping other episodes in their respective temporal clique by having a part of a first duration of the first story episode scheduled at a time in the temporal layout that is the same as a part of the duration of at least one, but not all, of the other episodes in the temporal clique, at least one of the first durations not starting at the same time as the duration of at least one or more of the other episodes in the temporal clique;

spatially organizing the episodes in each temporal clique independently of the episodes in the other temporal cliques, the spatial organizing placing the story episodes into a spatial organization so that any first story episode in the temporal clique does not clash with any other story episode in the temporal clique when the story episodes in the temporal clique are played, a clash being an interference between one or more played story episodes;

placing each story in a node of a directed graph, each of the nodes being a story node, the story nodes having relationships among one another established by one or more arcs of the directed graph, the relationships defined by asynchronous conditions, and each of the story nodes on the directed graph capable of being played if the asynchronous conditions of an arc establishing relationships with the story node are satisfied.

9. A method of organizing and playing stories in a hyperstory, as in claim 8, where the directed graph is a petri net.

10. A method of organizing and playing stories, as in claim 8, where the relationship between two or more nodes is a branch relationship where control is passed from a story in a first node to a story in a second node.

11. A method of organizing and playing stories, as in claim 8, where the relationship between two or more of the story nodes is a call relationship where control is passed from a first story in a first story node to a second story in a second story node and then back to the first story after part or all of the second story finishes.

12. A method of organizing and playing stories, as in claim 8, where one or more conditions is enabled by a button.

13. A method of organizing and playing stories, as in claim 8, where the conditions are satisfied to change playing of the stories in the nodes during the execution of the method.

14. A method of organizing and playing stories, as in claim 8, where controls enable conditions that are used to browse the hyperstory.

15. A method of organizing and playing stories, as in claim 8, where the stories are played to educate a user.

16. A method of playing a multimedia story, comprising the following steps:

selecting one or more multimedia segments from a plurality of segments, the selected segments being episodes of the story, the multimedia segments having one or more sensory qualities when played on a multimedia computer system and the multimedia segments being stored on a memory of the computer system;

scheduling the story episodes in a schedule sequence that defines the story;

grouping the story episodes into one or more temporal cliques, each of one or more first episodes in each temporal clique overlapping one or more of the other episodes in the temporal clique by having a part of a first duration of the first episode scheduled at a time in the schedule sequence that is the same as a part of a duration of at least one, but not all, of the other episodes in the temporal clique, at least one of the first durations not starting at the same time as the duration of at least one or more of the other episodes in the temporal clique;

spatially organizing the episodes in each temporal clique independently of the episodes in other temporal cliques, the spatial organization placing the episodes in the temporal clique in a spatial organization so that the first episode does not clash with any of the other episodes in the temporal clique when the episodes in the temporal clique are played, a clash occurring when a first multimedia segment plays at the same time as one or more other multimedia segments and the first multimedia segment interferes with one or more of the other multimedia segments; and playing the episodes of the story in time according to the schedule and in space according to the spatial organization of the temporal cliques.

17. An apparatus for playing multimedia stories, comprising:

a computer means having a memory means for storing a plurality of multimedia segments;

a means for selecting a subset of multimedia segments, the subset of segments being episodes in a story, the multimedia segments having one or more sensory qualities when played on the computer means;

a temporal layout means for scheduling the story episodes in time to define the story;

a means for organizing the story episodes into temporal cliques, each temporal clique containing one or more first episodes that overlap one or more other episodes in their respective temporal clique, the overlap being a part of a first duration of one or more of the first episodes being scheduled at a time in the temporal layout means that is the same as a part of a duration of at least one, but not all, of the other episodes in the temporal clique, at least one of the first durations not starting at the same time as the duration of at least one or more of the other episodes in the temporal clique;

a means for spatially organizing the story episodes of each temporal clique independently of the spatial organization of the story episodes in other temporal cliques, the spatially organizing placing the episodes in the temporal clique in a spatial organization so that the first episode does not clash with any of the other episodes in the temporal clique when the episodes in the temporal clique are played, a clash occurring when a first multimedia segment plays at the same time as one or more other multimedia segments and the first multimedia segment interferes with one or more of the other multimedia segments; and a computer playing means for playing the episodes in time as defined by the temporal layout schedule and in space according to the spatial organization of the temporal cliques.

* * * * *